United States Patent
Sullivan et al.

(10) Patent No.: US 9,199,131 B2
(45) Date of Patent: *Dec. 1, 2015

(54) MULTI-LAYER CORE GOLF BALL

(71) Applicant: Acushnet Company, Fairhaven, MA (US)

(72) Inventors: Michael J. Sullivan, Old Lyme, CT (US); Derek A. Ladd, Acushnet, MA (US); Edmund A. Hebert, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,348

(22) Filed: Dec. 9, 2014

(65) Prior Publication Data

US 2015/0094169 A1     Apr. 2, 2015

Related U.S. Application Data

(63) Continuation of application No. 14/028,910, filed on Sep. 17, 2013, now Pat. No. 8,915,800, which is a continuation of application No. 13/656,961, filed on Oct. 22, 2012, now Pat. No. 8,556,748, which is a (Continued)

(51) Int. Cl.
*A63B 37/06* (2006.01)
*A63B 37/00* (2006.01)
(Continued)

(52) U.S. Cl.
CPC ......... *A63B 37/0075* (2013.01); *A63B 37/0003* (2013.01); *A63B 37/0031* (2013.01); *A63B 37/0037* (2013.01); *A63B 37/0047* (2013.01); *A63B 37/0049* (2013.01); *A63B 37/0059* (2013.01); *A63B 37/0062* (2013.01); *A63B 37/0065* (2013.01); *A63B 37/0077* (2013.01); *A63B 37/0092* (2013.01); *A63B 37/02* (2013.01); *A63B 37/04* (2013.01); *B29C 43/146* (2013.01); *B29C 43/18* (2013.01); *B29C 70/70* (2013.01); *C08L 9/00* (2013.01); *C08L 23/08* (2013.01); *A63B 37/0033* (2013.01);

(Continued)

(58) Field of Classification Search
CPC ........... A63B 37/0059; A63B 37/0047; A63B 37/0049; A63B 37/0037
USPC ................................................... 473/373, 374
See application file for complete search history.

(56) References Cited

U.S. PATENT DOCUMENTS

| 4,508,309 A | 4/1985 | Brown |
| 4,625,964 A | 12/1986 | Yamada |

(Continued)

FOREIGN PATENT DOCUMENTS

| WO | WO0023519 | 4/2000 |
| WO | WO0129129 | 4/2001 |

*Primary Examiner* — Raeann Gorden
(74) *Attorney, Agent, or Firm* — Margaret C. Baker

(57) ABSTRACT

A golf ball comprising: an inner core having a compression of less than about 60, wherein the inner core comprises a highly neutralized thermoplastic ionomer; at least one intermediate layer surrounding the inner core, having a hardness of at least about 55 Shore D, a specific gravity and a flexural modulus such that each of the hardness, specific gravity and flexural modulus of the intermediate layer is greater than a hardness, a specific gravity, and a flexural modulus of the inner core; and a cover surrounding the at least one intermediate layer, having a flexural modulus and a Shore D hardness that are greater than a flexural modulus and a hardness of the inner core, and a Shore D hardness of the cover is at least 60.

6 Claims, 1 Drawing Sheet

Related U.S. Application Data continuation of application No. 13/036,586, filed on Feb. 28, 2011, now Pat. No. 8,303,438, which is a continuation of application No. 12/543,537, filed on Aug. 19, 2009, now Pat. No. 7,918,750, which is a continuation of application No. 12/031,131, filed on Feb. 14, 2008, now Pat. No. 7,591,741, which is a continuation of application No. 11/459,477, filed on Jul. 24, 2006, now Pat. No. 7,354,357, which is a continuation-in-part of application No. 11/061,338, filed on Feb. 18, 2005, now Pat. No. 7,331,878, which is a continuation-in-part of application No. 10/773,906, filed on Feb. 6, 2004, now Pat. No. 7,255,656.

(51) Int. Cl.

| | |
|---|---|
| *A63B 37/02* | (2006.01) |
| *A63B 37/04* | (2006.01) |
| *B29C 43/14* | (2006.01) |
| *B29C 43/18* | (2006.01) |
| *B29C 70/70* | (2006.01) |
| *C08L 9/00* | (2006.01) |
| *C08L 23/08* | (2006.01) |
| *A63B 45/00* | (2006.01) |
| *A63B 37/08* | (2006.01) |
| *B29C 43/30* | (2006.01) |
| *B29C 43/36* | (2006.01) |
| *B29K 105/00* | (2006.01) |
| *B29L 31/52* | (2006.01) |
| *B29L 31/54* | (2006.01) |
| *C08L 53/02* | (2006.01) |
| *C08L 75/02* | (2006.01) |
| *C08L 75/04* | (2006.01) |

(52) U.S. Cl.
CPC ......... *A63B37/0043* (2013.01); *A63B 37/0045* (2013.01); *A63B 37/0061* (2013.01); *A63B 37/0064* (2013.01); *A63B 37/0066* (2013.01); *A63B 37/0076* (2013.01); *A63B 37/0078* (2013.01); *A63B 45/00* (2013.01); *A63B 2037/085* (2013.01); *A63B 2209/00* (2013.01); *B29C 43/305* (2013.01); *B29C 2043/3644* (2013.01); *B29K 2105/256* (2013.01); *B29L 2031/52* (2013.01); *B29L 2031/54* (2013.01); *C08L 53/02* (2013.01); *C08L 75/02* (2013.01); *C08L 75/04* (2013.01)

(56) References Cited

U.S. PATENT DOCUMENTS

| | | | |
|---|---|---|---|
| 4,714,253 A | 12/1987 | Nakahara et al. | |
| 4,781,383 A | 11/1988 | Kamada et al. | |
| 4,863,167 A | 9/1989 | Matsuki et al. | |
| 5,002,281 A | 3/1991 | Nakahara | |
| 5,006,297 A | 4/1991 | Brown et al. | |
| 5,048,126 A | 9/1991 | McLaughlin | |
| 5,104,126 A | 4/1992 | Gentiluomo | |
| 5,184,828 A | 2/1993 | Kim et al. | |
| 5,273,286 A | 12/1993 | Sun | |
| 5,334,673 A | 8/1994 | Wu | |
| 5,482,285 A | 1/1996 | Yabuki et al. | |
| 5,484,870 A | 1/1996 | Wu | |
| 5,490,674 A | 2/1996 | Hamada et al. | |
| 5,580,927 A | 12/1996 | Chou et al. | |
| 5,692,974 A | 12/1997 | Wu et al. | |
| 5,703,166 A | 12/1997 | Rajagopalan et al. | |
| 5,733,428 A | 3/1998 | Calabria et al. | |
| 5,743,816 A | 4/1998 | Ohsumi et al. | |
| 5,772,531 A | 6/1998 | Ohsumi et al. | |
| 5,824,746 A | 10/1998 | Harris et al. | |
| 5,908,358 A | 6/1999 | Wu | |
| 5,919,100 A | 7/1999 | Boehm et al. | |
| 5,929,189 A | 7/1999 | Ichikawa et al. | |
| 5,971,870 A | 10/1999 | Sullivan et al. | |
| 5,981,658 A | 11/1999 | Rajagopalan et al. | |
| 6,025,442 A | 2/2000 | Harris et al. | |
| 6,056,842 A | 5/2000 | Dalton et al. | |
| 6,117,024 A | 9/2000 | Dewanjee | |
| 6,120,393 A | 9/2000 | Sullivan et al. | |
| 6,142,887 A | 11/2000 | Sullivan et al. | |
| 6,180,040 B1 | 1/2001 | Ladd et al. | |
| 6,180,722 B1 | 1/2001 | Dalton et al. | |
| 6,193,619 B1 | 2/2001 | Wu et al. | |
| 6,207,784 B1 | 3/2001 | Rajagopalan | |
| 6,210,294 B1 | 4/2001 | Wu | |
| 6,221,960 B1 | 4/2001 | Rajagopalan | |
| 6,302,808 B1 | 10/2001 | Dalton et al. | |
| 6,309,313 B1 | 10/2001 | Peter | |
| 6,315,682 B1 | 11/2001 | Iwami et al. | |
| 6,390,935 B1 | 5/2002 | Sugimoto | |
| 6,390,936 B1 | 5/2002 | Sugimoto | |
| 6,494,795 B2 | 12/2002 | Sullivan | |
| 6,506,851 B2 | 1/2003 | Wu | |
| 6,547,677 B2 | 4/2003 | Sullivan et al. | |
| 6,653,382 B1 * | 11/2003 | Statz et al. | 524/400 |
| 6,663,564 B2 | 12/2003 | Miller-Kovach et al. | |
| 6,685,579 B2 | 2/2004 | Sullivan | |
| 6,835,794 B2 | 12/2004 | Wu et al. | |
| 7,041,008 B2 | 5/2006 | Nesbitt | |
| 7,354,357 B2 * | 4/2008 | Sullivan et al. | 473/373 |
| 7,591,741 B2 * | 9/2009 | Sullivan et al. | 473/376 |
| 7,918,750 B2 * | 4/2011 | Sullivan et al. | 473/376 |
| 8,556,748 B2 * | 10/2013 | Sullivan et al. | 473/376 |
| 8,915,800 B2 * | 12/2014 | Sullivan et al. | 473/373 |
| 2002/0019268 A1 | 2/2002 | Tsunoda et al. | |
| 2002/0086931 A1 | 7/2002 | Ladd et al. | |
| 2003/0013549 A1 | 1/2003 | Rajagopalan et al. | |
| 2004/0082407 A1 | 4/2004 | Sullivan et al. | |
| 2005/0130767 A1 | 6/2005 | Sullivan et al. | |
| 2005/0143525 A1 | 6/2005 | Wu et al. | |
| 2005/0176523 A1 | 8/2005 | Boehm et al. | |
| 2005/0255941 A1 | 11/2005 | Sullivan et al. | |

* cited by examiner

MULTI-LAYER CORE GOLF BALL

CROSS-REFERENCE TO RELATED APPLICATIONS

The present application is a continuation of U.S. application Ser. No. 14/028,910, filed Sep. 17, 2013, which is a continuation of U.S. application Ser. No. 13/656,961, filed Oct. 22, 2012 and issued as U.S. Pat. No. 8,556,748, which is a continuation of U.S. application Ser. No. 13/036,586, filed Feb. 28, 2011, and issued as U.S. Pat. No. 8,303,438, which is a continuation of U.S. application Ser. No. 12/543,537, filed Aug. 19, 2009 and issued as U.S. Pat. No. 7,918,750, which is a continuation of U.S. application Ser. No. 12/031,131, filed on Feb. 14, 2008, issued as U.S. Pat. No. 7,591,741, which is a continuation of U.S. application Ser. No. 11/459,477, filed on Jul. 24, 2006 and issued as U.S. Pat. No. 7,354,357, which is a continuation-in-part of U.S. application Ser. No. 11/061,338, filed on Feb. 18, 2005 and issued as U.S. Pat. No. 7,331,878, and U.S. application Ser. No. 10/773,906, filed on Feb. 6, 2004 and issued as U.S. Pat. No. 7,255,656, each of which are incorporated by reference herein in their entirety.

FIELD OF THE INVENTION

The invention generally relates to golf balls, and more particularly the invention is directed to golf balls having multi-layered cores having a relatively soft, low compression inner core surrounded by a relatively rigid outer core and cover. The golf balls may also comprise intermediate core layers.

BACKGROUND OF THE INVENTION

Two-layer golf balls are typically made with a single solid core encased by a cover. These balls are generally most popular among recreational golfers, because they are durable and provide maximum distance. Typically, the solid core is made of polybutadiene crosslinked with zinc diacrylate and/or similar crosslinking agents. The cover material is a tough, cut-proof blend of one or more materials known as ionomers, such as SURLYN®, sold commercially by DuPont, FORMION®, sold commercially by A. Schulman, Inc., or PRIMACOR® or DOWLEX®, both sold commercially by Dow Chemical Co.

Other multi-layer golf balls may have multiple core layers, multiple intermediate layers, and/or multiple cover layers. They tend to overcome some of the undesirable features of conventional two-layer balls, such as hard feel and less control, while maintaining the positive attributes, such as increased initial velocity and distance. However, it is desirable that multi-layer balls have a "feel" similar to wound balls, especially for more advanced players.

Additionally, the spin rates of golf balls affect the overall control of the balls depending on the skill level of the players. Golf balls with lower spin rates exhibit improved distance, but are harder to control on short shots, such as approaches to greens. Conversely, higher spin rates afford skilled players more control, but inhibit driving distances. To strike a balance between the spin rates and the playing characteristics of golf balls, additional layers, such as intermediate layers, outer core layers and inner cover layers, are often added to the solid core golf balls to improve the playing characteristics of the ball.

The patent literature discloses a number of multi-layer golf balls. U.S. Patent Pub. No. 2005-0130767 A1, which is commonly owned and incorporated herein by reference in its entirety, is directed to an improved multi-layer golf ball displaying a certain spin profile. The ball has a generally rigid, thermosetting polybutadiene outer core surrounding a relatively soft, low compression inner core. The inner core has a hardness that is less than the hardness of the outer core, and a specific gravity that is less than or equal to the specific gravity of the outer core. The inner core and outer core are formulated to provide a combined overall core compression of greater than about 50.

U.S. Pat. No. 6,685,579, which is commonly owned and incorporated by reference in its entirety, is directed to golf balls having a cover comprising three or more layers: an inner cover layer, an outer cover layer, and an intermediate cover layer. The outer cover layer comprises a composition formed of a reactive liquid material, and the combination of the thickness of the cover layers is about 0.125 inches. Golf balls prepared accordingly can exhibit substantially the same or higher coefficient of restitution ("COR"), with a decrease in compression or flexural modulus, compared to golf balls of conventional construction. The resultant golf balls typically have a COR of greater than about 0.7 and an Atti compression of at least about 40. As used herein, the term coefficient of restitution for golf balls is defined as the ratio of the rebound velocity to the inbound velocity when balls are fired into a rigid plate. A discussion of COR and suitable test methods for measuring COR can be found, for example, in U.S. Pat. No. 6,547,677, which is incorporated herein by reference.

U.S. Patent Pub. No. 2004-0082407 A1, which is also commonly owned and incorporated by reference in its entirety, is directed to a golf ball comprising an inner core, an outer core, and a cover. At least one layer of the golf ball is made from a low compression, high COR material, and is being supported by a low deformation, high compression layer. The resulting golf ball has high COR at fast and slow impact speeds and low compression for controlled greenside play.

Varying materials, density, or specific gravity among the various layers of a golf ball controls the spin rate of the golf ball. For instance, redistributing weight from the outer layers of the golf ball to the inner layers decreases the moment of inertia of the golf ball, thereby increasing the spin rate and vice versa as discussed in commonly owned U.S. Pat. No. 6,494,795 B2.

Hence, there remains a need for multi-layer golf balls with improved distance and feel for low swing-speed players.

SUMMARY OF THE INVENTION

This invention is directed to a multi-layer golf ball comprising an inner core, a cover layer, and at least one intermediate layer between the inner core and the cover layer. The layers of the ball vary in properties according to gradients. The coefficient of restitution gradient from the inner core to the outermost layer is from low to high, or the initial velocity gradient from the inner core to the cover layer is from slow to fast. Similarly, the flexural modulus increases from the inner core to the outer cover layer, as do the compression and the hardness of the layers. These properties produce a golf ball that provides improved distance and feel for low swing-speed players.

According to the present invention, the inner core has a compression of less than about 60, more preferably less than about 40, and most preferably less than about 30. The intermediate layer is harder than the inner core, with a hardness greater than about 55 Shore D, and has a higher specific gravity than that of the inner core. The intermediate layer also preferably has a higher flexural modulus than the inner core.

The cover layer is constructed such that the ratio of the flexural modulus in ksi to the Shore D hardness is less than 1.0, more preferably less than 0.9, and most preferably less than 0.8.

In another aspect of the invention, the specific gravity of the inner core is less than 1.15, and preferably less than 1.05. The specific gravity of the intermediate layer is greater than 1.15, and preferably greater than 1.20, and most preferably greater than 1.25.

In yet another aspect of the invention, the cover of the ball has a hardness of at least 60 Shore D, more preferably at least 65 Shore D, a flexural modulus of at least 60 ksi, and a thickness of 0.03 to 0.5 inches. The cover comprises an acrylic acid ionomer with an acid content between 13% and 16%, and the ionomer is neutralized with a cation.

The present invention is also directed to a golf ball with an inner core, at least one intermediate core layer that has a larger specific gravity than the inner core, at least one outer core layer that has a larger specific gravity than the intermediate core layer, and a cover with a specific gravity less than the outer core layer. The volume of the inner core layer is preferably greater than the volume of the outer core layer, which in turn is greater than the volume of the cover layer. The cover layer is harder than the outer core layer, which is harder than the inner core layer.

In another aspect of the invention, a multi-layer golf ball with hardness and specific gravity gradients is constructed with at least one of the core layers comprising a highly neutralized thermoplastic ionomer (HNP). Preferably, the inner core comprises an unfilled HNP having a specific gravity less than 0.95.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
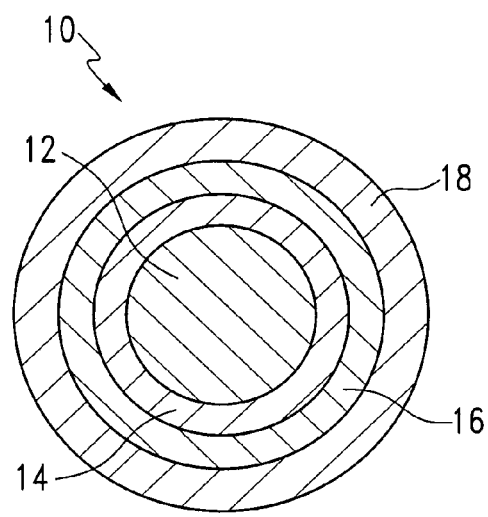
FIG. 1 is a cross-sectional representation of a golf ball formed in accordance with a first embodiment of the present invention.

The present invention is directed to multi-layer golf balls having a core, a cover layer, and at least one intermediate layer between the core and the cover layer. The core, the intermediate layers, and the cover layer may be constructed to have different properties. Several embodiments of the present invention are described below.

One embodiment of the present invention is a multi-layer golf ball comprising an inner core, an outer core layer surrounding the inner core, and a cover layer surrounding the core layers. An optional intermediate core layer may be present inside the outer core layer, but surrounding the inner core. The inner core preferably has a low specific gravity, a low flexural modulus, and a low hardness. The outer core layer has a higher specific gravity, a higher flexural modulus, and a higher hardness than the inner core. The cover has a flexural modulus value that is at least the same as that of the outer core layer or higher. Furthermore, the cover is constructed such that the ratio of the hardness of the cover (in Shore D) divided by the flexural modulus of the cover (in ksi) is less than 1.0. In this embodiment, the inner core is preferably made from polybutadiene, and the cover is preferably made from an ionomer, such as an acrylic acid ionomer, have an acid content of about 13% to 16%. Other suitable materials for the core and cover layer are discussed below. Preferred properties of the various layers of the multi-layer golf ball in this embodiment are specified in the table below:

|  | Inner Core | Outer Core Layer | Cover Layer |
| --- | --- | --- | --- |
| Diameter (Inches) | 1.40 | 0.10 | 0.04 |
| Compression (Atti) | <40 | 40-80 | 60-110 |
| Specific Gravity | <1.15 | >1.15 | <1.0 |
| Hardness (Shore D) | <40 | >55 | >60 (But < Flex Modulus) |
| Flexural Modulus (ksi) | 1-30 | 20-60 | >60 |
| Material | Polybutadiene | Polybutadiene or HNP | Acrylic Acid Ionomer (13%-16% acid) |

Another embodiment of the present invention is a multi-layer golf ball that is substantially similar to the first embodiment. However, in this second embodiment there is a COR gradient from slow to fast, e.g., the inner core has a low COR value, the outer core layer has a higher COR value, and the cover layer has an even higher COR value.

A third embodiment is also substantially similar to the first embodiment. However, in this embodiment at least one core layer comprises a highly neutralized thermoplastic ionomer (HNP), and preferably the inner core of the golf ball comprises an unfilled HNP having a specific gravity of about 0.95.

Yet another embodiment of the present invention is directed at a multi-layer golf ball comprising an inner core, at least one intermediate core layer, an outer core layer, and a cover layer. In this embodiment, a volume-decreasing gradient is present, e.g., the volume of the inner core is larger than volume of the intermediate core layer, which is larger than the volume of the outer core, which is larger than the volume of the cover layer. A hardness-increasing gradient is also present, resulting in a hard inner core, a slightly softer intermediate core layer, a slightly softer outer core layer, and an even softer cover layer. A specific gravity gradient is also present, progressing from an inner core with a lower specific gravity to an outer core layer with a higher specific gravity. However, the gradient does not progress all the way through the cover layer, as it is preferred in this embodiment that the specific gravity of the outer core layer is higher than the specific gravity of the cover layer.

These characteristics provide for a golf ball that will exhibit high speed, low spin, and high launch angles, while being able to be designed at relatively low or very low compressions. This combination of features is particularly suited to improve distance and feel for casual, recreational golfers who possess lower swing speeds, and the present invention is believed to outperform golf balls that are currently targeted at that market.

For example, the preferred cover layer of the present invention has a hardness to flexural modulus relationship such that the recreational golfer will enjoy low spin (and therefore more distance) off the tee, while still receiving higher spin (and therefore more control) while hitting approach shots into greens. The lower compression of the ball will produce a softer feel, which is especially advantageous when chipping and putting around the greens.

Figure 2:
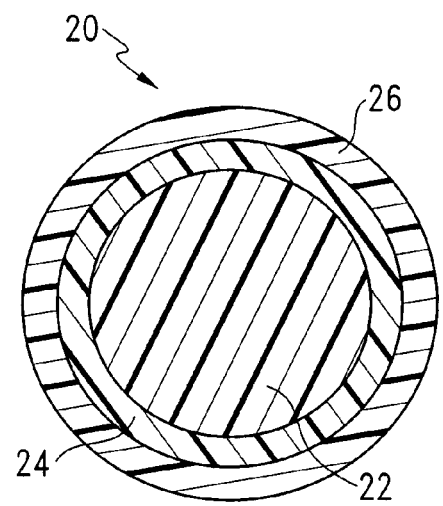
FIG. 2 is a cross-sectional representation of a golf ball formed in accordance with a second embodiment of the present invention.

As shown generally in FIGS. 1 and 2, reference numbers 10 and 20 designate golf balls in accordance to the present invention. As pictured in FIG. 1, some embodiments of golf ball 10 have an inner core 12, at least one intermediate core layer 14, an outer core layer 16, and a cover layer 18. Other embodiments, such as depicted by golf ball 20 in FIG. 2, may include only inner core 22, outer core layer 24, and cover layer 26. When the inner core is surrounded by multiple layers as pictured in FIGS. 1 and 2, it is preferable for the multiple layers to have a gradient in physical/mechanical properties, such as hardness, that increases from outermost to innermost layer or that decreases from outermost to innermost layer. Other property gradients in addition to hardness can result from the molding process and use of layers, including velocity, coefficient of restitution, etc.

Any or all of the inner core, intermediate core layers, and outer core layers of multi-layer golf ball 10 or 20 may comprise thermosetting or thermoplastic materials such as polyurethane, polyurea, partially or fully neutralized ionomers, thermosetting polydiene rubber such as polybutadiene, polyisoprene, ethylene propylene diene monomer rubber, ethylene propylene rubber, natural rubber, balata, butyl rubber, halobutyl rubber, styrene butadiene rubber or any styrenic block copolymer such as styrene ethylene butadiene styrene rubber, etc., metallocene or other single site catalyzed polyolefin, polyurethane copolymers, e.g. with silicone, as long as the material meets the gradient criteria described above.

In addition to the materials discussed above, compositions within the scope of the present invention can incorporate one or more polymers. Examples of suitable additional polymers for use in the present invention include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane or any metallocene-catalyzed polymers of these species. Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine or decamethylenediamine, 1,4-cyclohexyldiamine or m-xylylenediamine; (2) a ring-opening polymerization of cyclic lactam, such as ε-caprolactam or w-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other preferred materials suitable for use as an additional material in core compositions within the scope of the present invention include polyester elastomers marketed under the tradename SKYPEL by SK Chemicals of South Korea, or diblock or triblock copolymers marketed under the tradename SEPTON by Kuraray Corporation of Kurashiki, Japan, and KRATON by Kraton Polymers Group of Companies of Chester, United Kingdom. All of the materials listed above can provide for particular enhancements to ball layers prepared within the scope of the present invention.

Suitable ionomeric polymers (i.e., copolymer or terpolymer-type ionomers) for use as core layers include α-olefin/unsaturated carboxylic acid copolymer-type ionomeric or terpolymer-type ionomeric resins. Copolymeric ionomers are obtained by neutralizing at least a portion of the carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Copolymeric ionomers include ionomers having varied acid contents and degrees of acid neutralization that are neutralized by monovalent or bivalent cations discussed below.

Terpolymeric ionomers are obtained by neutralizing at least a portion of carboxylic groups in a terpolymer of an α-olefin, and an α,β-unsaturated carboxylic acid having 3 to 8 carbon atoms, and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, α-chloroacrylic, crotonic, maleic, fumaric, and itaconic acid. Terpolymeric ionomers include ionomers having varied acid contents and degrees of acid neutralization, neutralized by monovalent or bivalent cations as discussed below. Examples of suitable ionomeric resins include those marketed under the name SURLYN® manufactured by E.I. du Pont de Nemours & Company of Wilmington, Del., and IOTEK® manufactured by Exxon Mobil Corporation of Irving, Tex.

Silicone materials also are usable as core layers. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl, and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxa-ne copolymers; trimethylsiloxy-endblocked methylphenylsiloxane-dimethylsil-oxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, N.Y., and Elastosil by Wacker Silicones of Adrian, Mich.

Other types of copolymers also can be added to compositions within the scope of the present invention. Examples of copolymers comprising epoxy monomers and which are suitable for use within the scope of the present invention include styrene-butadiene-styrene block copolymers, in which the polybutadiene block contains an epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd. of Osaka, Japan.

A preferred embodiment for a slow core layer comprises polybutadiene, SBR, little or no zinc diacrylate (from 0-10 parts), optional zinc dimethacrylate, or a non zinc salt unsaturated monomer such as trimethylol propane triacrylate (SR-350 sold by the Sartomer Co.), a peroxide initiator. Other formulations for the core are disclosed in co-pending commonly owned U.S. Pub. No. 2005-0255941 A1, which is incorporated herein by reference in its entirety. Alternatively, a non-peroxide, sulfur vulcanized formulation, such as that disclosed in U.S. Pat. No. 7,041,008 can be used. This reference is incorporated by reference herein in its entirety.

The core diameter ranges from about 0.100 inch to about 1.64 inch, preferably from about 1.00 inch to about 1.62 inch. Typical core diameter ranges from 0.25 inch to 1.625 inch in increments of 0.05 inch. Common core sizes are 0.050 inch, 1.00 inch, 1.10 inches, 1.20 inches, 1.30 inches, 1.40 inches, 1.45 inches, 1.50 inches, 1.55 inches, 1.57 inches, 1.58 inches, 1.59 inches, and 1.60 inches. The sizes of the core plus any intermediate layer or layers may be within the same size or size range as the core sizes above, or may be slightly larger.

Other suitable materials for the core include, but are not limited to:

(1) Polyurethanes, such as those prepared from polyols and diisocyanates or polyisocyanates and those disclosed in U.S. Pat. Nos. 5,334,673 and 6,506,851 and U.S. Pat. No. 6,663,564;

(2) Polyureas, such as those disclosed in U.S. Pat. No. 5,484,870 and U.S. Pat. No. 6,835,794; and (3) Polyurethane-urea hybrids, blends or copolymers comprising urethane or urea segments.

The core of the multi-layer golf ball preferably includes a polyurethane composition comprising the reaction product of at least one polyisocyanate and at least one curing agent. The curing agent can include, for example, one or more diamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent.

The core or any layer in the golf ball can also be made from highly-neutralized polymers and blends thereof ("HNP"). The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3 ksi and about 200 ksi.

In one embodiment of the present invention the HNP's are ionomers and/or their acid precursors that are preferably neutralized, either filly or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth)acrylic acid/n-butyl, acrylate, ethylene/(meth)acrylic acid/ethyl acrylate, and ethylene/(meth)acrylic acid/methyl acrylate copolymers.

Ionomers are typically neutralized with a metal cation, such as lithium, sodium, potassium, magnesium, calcium, barium, lead, tin, zinc, aluminum, or a mixture thereof. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90-100%, most preferably 100% without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be partially neutralized with metal cations alone. The acid moiety in the acid copolymer is neutralized about 1 to about 100%, preferably at least about 40 to about 100%, and more preferably at least about 90 to about 100%, to form an ionomer by a cation such as lithium, sodium, potassium, magnesium, calcium, barium, lead, tin, zinc, aluminum, or a mixture thereof.

The acid copolymers of the present invention are prepared from 'direct' acid copolymers, copolymers polymerized by adding all monomers simultaneously, or by grafting of at least one acid-containing monomer onto an existing polymer.

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

The copolyetheresters are comprised of a multiplicity of recurring long chain units and short chain units joined head-to-tail through ester linkages, the long chain units being represented by the formula:

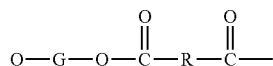

and the short chain units being represented by the formula:

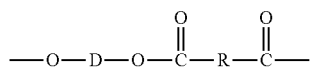

where G is a divalent radical remaining after the removal of terminal hydroxyl groups from a poly(alkylene oxide)glycol having a molecular weight of about 400-8000 and a carbon to oxygen ratio of about 2.0-4.3; R is a divalent radical remaining after removal of hydroxyl groups from a diol having a molecular weight less than about 250; provided said short chain ester units amount to about 15-95 percent by weight of said copolyetherester. The preferred copolyetherester polymers are those where the polyether segment is obtained by polymerization of tetrahydrofuran and the polyester segment is obtained by polymerization of tetramethylene glycol and phthalic acid. For purposes of the invention, the molar ether:ester ratio can vary from 90:10 to 10:80; preferably 80:20 to 60:40; and the Shore D hardness is less than 70; preferably less than about 40.

The copolyetheramides are comprised of a linear and regular chain of rigid polyamide segments and flexible polyether segments, as represented by the general formula:

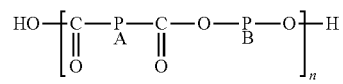

wherein PA is a linear saturated aliphatic polyamide sequence formed from a lactam or amino acid having a hydrocarbon chain containing 4 to 14 carbon atoms or from an aliphatic $C_6$-$C_8$ diamine, in the presence of a chain-limiting aliphatic carboxylic diacid having 4-20 carbon atoms; said polyamide having an average molecular weight between 300 and 15,000; and PB is a polyoxyalkylene sequence formed from linear or branched aliphatic polyoxyalkylene glycols, mixtures thereof or copolyethers derived therefrom, said polyoxyalkylene glycols having a molecular weight of less than or equal to 6000; and n indicates a sufficient number of repeating units so that said polyetheramide copolymer has an intrinsic viscosity of from about 0.6 to about 2.05. The preparation of these polyetheramides comprises the step of reacting a dicarboxylic polyamide, the COOH groups of which are located at the chain ends, with a polyoxyalkylene glycol hydroxylated at the chain ends, in the presence of a catalyst such as a tetraalkyl ortho titanate having the general formula $Ti(OR)_x$ wherein R is a linear branched aliphatic hydrocarbon radical having 1 to 24 carbon atoms. Again, the more polyether units incorporated into the copolyetheramide, the softer the polymer. The ether:amide ratios are as described above for the ether:ester ratios, as is the Shore D hardness.

The elastomeric polyolefins are polymers composed of ethylene and higher primary olefins such as propylene, hexene, octene, and optionally 1,4-hexadiene and or ethylidene norbornene or norbornadiene. The elastomeric polyolefins can be optionally functionalized with maleic anhydride, epoxy, hydroxy, amine, carboxylic acid, sulfonic acid, or thiol groups.

Thermoplastic polyurethanes are linear or slightly chain branched polymers consisting of hard blocks and soft elastomeric blocks. They are produced by reacting soft hydroxy terminated elastomeric polyethers or polyesters with diisocyanates, such as methylene diisocyanate ("MDI"), p-phenylene diisocyanate ("PPDI"), or toluene diisocyanate ("TDI"). These polymers can be chain extended with glycols, secondary diamines, diacids, or amino alcohols. The reaction products of the isocyanates and the alcohols are called urethanes, and these blocks are relatively hard and high melting. These hard, high melting blocks are responsible for the thermoplastic nature of the polyurethanes.

Block styrene diene copolymers and their hydrogenated derivatives are composed of polystyrene units and polydiene units. They may also be functionalized with moieties such as OH, $NH_2$, epoxy, COOH, and anhydride groups. The polydiene units are derived from polybutadiene, polyisoprene units, or copolymers of these two. In the case of the copolymer it is possible to hydrogenate the polyolefin to give a saturated rubbery backbone segments. These materials are usually referred to as SBS, SIS, or SEBS thermoplastic elastomers and they can also be functionalized with maleic anhydride.

Grafted metallocene-catalyzed polymers are also useful for blending with the HNP's of the present invention. The grafted metallocene-catalyzed polymers, while conventionally neutralized with metal cations, may also be neutralized, either partially for fully, with organic acids or salts thereof and an appropriate base. Grafted metallocene-catalyzed polymers, such as those disclosed in U.S. Pat. Nos. 5,703,166; 5,824,746; 5,981,658; and 6,025,442, which are incorporated herein by reference, useful in the golf balls of the invention are available in experimental quantities from DuPont under the tradenames SURLYN® NMO 525D, SURLYN® NMO 524D, and SURLYN® NMO 499D, all formerly known as the FUSABOND® family of polymers, or may be obtained by subjecting a non-grafted metallocene-catalyzed polymer to a post-polymerization reaction to provide a grafted metallocene-catalyzed polymer with the desired pendant group or groups. Examples of metallocene-catalyzed polymers to which functional groups may be grafted for use in the invention include, but are not limited to, homopolymers of ethylene and copolymers of ethylene and a second olefin, preferably, propylene, butene, pentene, hexene, heptene, octene, and norbornene. Generally, the invention includes golf balls having at least one layer comprising at least one grafted metallocene-catalyzed polymer or polymer blend, where the grafted metallocene-catalyzed polymer is produced by grafting a functional group onto a metallocene-catalyzed polymer having the formula:

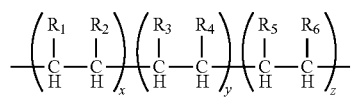

wherein $R_1$ is hydrogen, branched or straight chain alkyl such as methyl, ethyl, propyl, butyl, pentyl, hexyl, heptyl, and octyl, carbocyclic, or aromatic; $R_2$ is hydrogen, lower alkyl including $C_1$-$C_5$; carbocyclic, or aromatic; $R_3$ is hydrogen, lower alkyl including $C_1$-$C_5$, carbocyclic, or aromatic; $R_4$ is selected from the group consisting of H, $C_nH_{2n+1}$, where n=1 to 18, and phenyl, in which from 0 to 5H within $R_4$ can be replaced by substituents COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$-$C_5$, carbocyclic, or aromatic; $R_6$ is hydrogen, lower alkyl including $C_1$-$C_5$, carbocyclic, or aromatic; and wherein x, y and z are the relative percentages of each co-monomer. X can range from about 1 to 99 percent or more preferably from about 10 to about 70 percent and most preferred, from about 10 to 50 percent. Y can be from 99 to1 percent, preferably, from 90 to 30 percent, or most preferably, 90 to 50 percent. Z can range from about 0 to about 49 percent. One of ordinary skill in the art would understand that if an acid moiety is present as a ligand in the above polymer that it may be neutralized up to 100% with an organic fatty acid as described above.

Metallocene-catalyzed copolymers or terpolymers can be random or block and may be isotactic, syndiotactic, or atactic. The pendant groups creating the isotactic, syndiotactic, or atactic polymers are chosen to determine the interactions between the different polymer chains making up the resin to control the final properties of the resins used in golf ball covers, cores, or intermediate layers. As will be apparent to those skilled in the art, grafted metallocene-catalyzed polymers useful in the invention that are formed from metallocene-catalyzed random or block copolymers or terpolymers will also be random or block copolymers or terpolymers, and will have the same tacticity of the metallocene-catalyzed polymer backbone.

As used herein, the term "phrase branched or straight chain alkyl" means any substituted or unsubstituted acyclic carbon-containing compounds. Examples of alkyl groups include lower alkyl, for example, methyl, ethyl, n-propyl, iso-propyl, n-butyl, iso-butyl or t-butyl; upper alkyl, for example, octyl, nonyl, decyl, and the like; and lower alkylene, for example, ethylene, propylene, butylene, pentene, hexene, octene, norbornene, nonene, decene, and the like.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, the term "substituted and unsubstituted carbocyclic" means cyclic carbon-containing compounds, including, but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups having from 1-28 carbon atoms. The cyclic groups of the invention may further comprise a heteroatom.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, and 2,2-methylphenylbutyl.

Non-grafted metallocene-catalyzed polymers useful in the present invention are commercially available under the trade name AFFINITY® polyolefin plastomers and ENGAGE® polyolefin elastomers, commercially available from Dow Chemical Company and DuPont-Dow. Other commercially available metallocene-catalyzed polymers can be used, such as EXACT®, commercially available from Exxon, and INSIGHT®, commercially available from Dow. The EXACT® and INSIGHT® line of polymers also have novel rheological behavior in addition to their other properties as a result of using a metallocene catalyst technology. Metallocene-catalyzed polymers are also readily available from Sentinel Products Corporation of Hyannis, Mass., as foamed sheets for compression molding.

Monomers useful in the present invention include, but are not limited to, olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester-derivatized mono-carboxylic and dicarboxylic acids, anhydrides of dicarboxylic acids, and cyclic imides of dicarboxylic acids.

In addition, metallocene-catalyzed polymers may also be functionalized by sulfonation, carboxylation, or the addition of an amine or hydroxy group. Metallocene-catalyzed polymers functionalized by sulfonation, carboxylation, or the addition of a hydroxy group may be converted to anionic ionomers by treatment with a base. Similarly, metallocene-catalyzed polymers functionalized by the addition of an amine may be converted to cationic ionomers by treatment with an alkyl halide, acid, or acid derivative.

The most preferred monomer is maleic anhydride, which, once attached to the metallocene-catalyzed polymer by the post-polymerization reaction, may be further subjected to a reaction to form a grafted metallocene-catalyzed polymer containing other pendant or functional groups. For example, reaction with water will convert the anhydride to a dicarboxylic acid; reaction with ammonia, alkyl, or aromatic amine forms an amide; reaction with an alcohol results in the formation of an ester; and reaction with a base results in the formation of an anionic ionomer.

The HNP's of the present invention may also be blended with single-site and metallocene catalysts and polymers formed therefrom. As used herein, the term "single-site catalyst," such as those disclosed in U.S. Pat. No. 6,150,462 which is incorporated herein by reference, refers to a catalyst that contains an ancillary ligand that influences the stearic and electronic characteristics of the polymerizing site in a manner that prevents formation of secondary polymerizing species. The term "metallocene catalyst" refers to a single-site catalyst wherein the ancillary ligands comprise substituted or unsubstituted cyclopentadienyl groups, and the term "non-metallocene catalyst" refers to a single-site catalyst other than a metallocene catalyst.

Non-metallocene single-site catalysts include, but are not limited to, the Brookhart catalyst, which has the following structure:

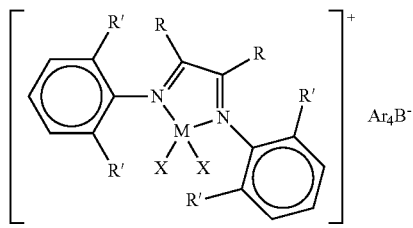

wherein M is nickel or palladium; R and R' are independently hydrogen, hydrocarbyl, or substituted hydrocarbyl; Ar is $(CF_3)_2C_6H_3$, and X is alkyl, methyl, hydride, or halide; the McConville catalyst, which has the structure:

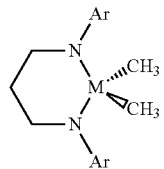

wherein M is titanium or zirconium; Iron (II) and cobalt (II) complexes with 2,6-bis(imino)pyridyl ligands, which have the structure:

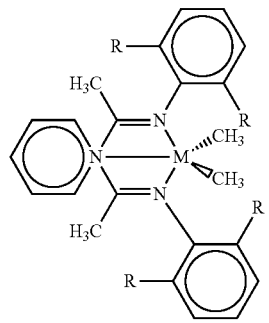

where M is the metal, and R is hydrogen, alkyl, or hydrocarbyl; Titanium or zirconium complexes with pyrroles as ligands also serve as single-site catalysts. These complexes have the structure:

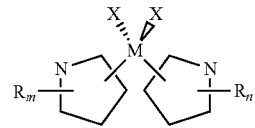

where M is the metal atom; m and n are independently 1 to 4, and indicate the number of substituent groups attached to the aromatic rings; $R_m$ and $R_n$ are independently hydrogen or alkyl; and X is halide or alkyl. Other examples include diimide complexes of nickel and palladium, which have the structure:

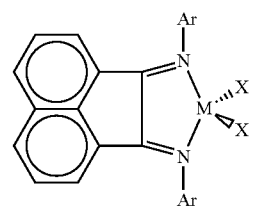

where Ar is aromatic, M is the metal, and X is halide or alkyl. Boratabenzene complexes of the Group IV or V metals also function as single-site catalysts. These complexes have the structure:

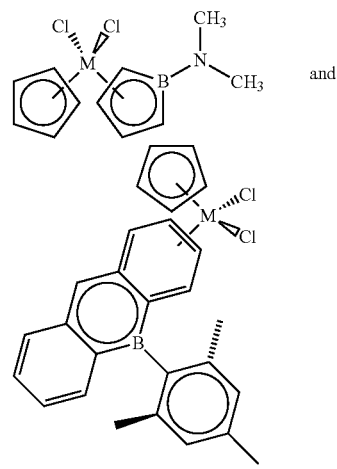

where B is boron and M is the metal atom.

As used herein, the term "single-site catalyzed polymer" refers to any polymer, copolymer, or terpolymer, and, in particular, any polyolefin polymerized using a single-site catalyst. The term "non-metallocene single-site catalyzed polymer" refers to any polymer, copolymer, or terpolymer, and, in particular, any polyolefin polymerized using a single-site catalyst other than a metallocene-catalyst. The catalysts discussed above are examples of non-metallocene single-site catalysts. The term "metallocene catalyzed polymer" refers to any polymer, copolymer, or terpolymer, and, in particular, any polyolefin, polymerized using a metallocene catalyst.

As used herein, the term "single-site catalyzed polymer blend" refers to any blend of a single-site catalyzed polymer and any other type of polymer, preferably an ionomer, as well as any blend of a single-site catalyzed polymer with another single-site catalyzed polymer, including, but not limited to, a metallocene-catalyzed polymer.

The terms "grafted single-site catalyzed polymer" and "grafted single-site catalyzed polymer blend" refer to any single-site catalyzed polymer or single-site catalyzed polymer blend in which the single-site catalyzed polymer has been subjected to a post-polymerization reaction to graft at least one functional group onto the single-site catalyzed polymer. A "post-polymerization reaction" is any reaction that occurs after the formation of the polymer by a polymerization reaction.

The single-site catalyzed polymer, which may be grafted, may also be blended with polymers, such as non-grafted single-site catalyzed polymers, grafted single-site catalyzed polymers, ionomers, and thermoplastic elastomers. Preferably, the single-site catalyzed polymer is blended with at least one ionomer of the preset invention.

Grafted single-site catalyzed polymers useful in the golf balls of the invention may be obtained by subjecting a non-grafted single-site catalyzed polymer to a post-polymerization reaction to provide a grafted single-site catalyzed polymer with the desired pendant group or groups. Examples of single-site catalyzed polymers to which functional groups may be grafted for use in the invention include, but are not limited to, homopolymers of ethylene and propylene and copolymers of ethylene and a second olefin, preferably, propylene, butene, pentene, hexene, heptene, octene, and norbornene. Monomers useful in the present invention include, but are not limited to olefinic monomers having as a functional group sulfonic acid, sulfonic acid derivatives, such as chlorosulfonic acid, vinyl ethers, vinyl esters, primary, secondary, and tertiary amines, epoxies, isocyanates, mono-carboxylic acids, dicarboxylic acids, partially or fully ester derivatized mono-carboxylic and dicarboxylic acids, anhydrides of dicarboxylic acids, and cyclic imides of dicarboxylic acids. Generally, this embodiment of the invention includes golf balls having at least one layer comprising at least one grafted single-site catalyzed polymer or polymer blend, where the grafted single-site catalyzed polymer is produced by grafting a functional group onto a single-site catalyzed polymer having the formula:

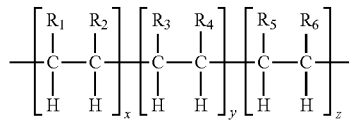

where $R_1$ is hydrogen, branched or straight chain alkyl such as methyl, ethyl, propyl, butyl, pentyl, hexyl, heptyl, and octyl, carbocyclic, aromatic or heterocyclic; $R_2$, $R_3$, $R_5$, and $R_6$ are hydrogen, lower alkyl including $C_1$-$C_5$, carbocyclic, aromatic or heterocyclic; $R_4$ is H, $C_nH_{2n+1}$, where n=1 to 18, and phenyl, in which from 0 to 5H within $R_4$ can be replaced by substituents such as COOH, $SO_3H$, $NH_2$, F, Cl, Br, I, OH, SH, epoxy, isocyanate, silicone, lower alkyl esters and lower alkyl ethers; also, $R_3$ and $R_4$ can be combined to form a bicyclic ring; and x, y and z are the relative percentages of each co-monomer. X can range from about 1 to about 100 percent or more preferably from 1 to 70 percent and most preferred, from about 1 to about 50 percent. Y can be from about 99 to about 0 percent, preferably, from about 9 to about 30 percent, or most preferably, about 9 to about 50 percent. Z can range from about 0 to about 50 percent. One of ordinary skill in the art would also understand that if an acid group is selected as a ligand in the above structure that it too could be neutralized with the organic fatty acids described above.

The HNP's of the present invention may also be blended with high crystalline acid copolymers and their ionomer derivatives (which may be neutralized with conventional metal cations or the organic fatty acids and salts thereof) or a blend of a high crystalline acid copolymer and its ionomer derivatives and at least one additional material, preferably an acid copolymer and its ionomer derivatives. As used herein, the term "high crystalline acid copolymer" is defined as a "product-by-process" in which an acid copolymer or its ionomer derivatives formed from a ethylene/carboxylic acid copolymer comprising about 5 to about 35 percent by weight acrylic or methacrylic acid, wherein the copolymer is polymerized at a temperature of about 130° C. to 200° C., at pressures greater than about 20 ksi preferably greater than about 25 ksi, more pref. from about 25 ksi to about 50 ksi, wherein up to about 70 percent, preferably 100 percent, of the acid groups are neutralized with a metal ion, organic fatty acids and salts thereof, or a mixture thereof. The copolymer can have a melt index ("MI") of from about 20 to about 300 g/10 min, preferably about 20 to about 200 g/10 min, and upon neutralization of the copolymer, the resulting acid copolymer and its ionomer derivatives should have an MI of from about 0.1 to about 30.0 g/10 min.

Suitable high crystalline acid copolymer and its ionomer derivatives compositions and methods for making them are disclosed in U.S. Pat. No. 5,580,927, the disclosure of which is hereby incorporated by reference in its entirety.

The high crystalline acid copolymer or its ionomer derivatives employed in the present invention are preferably formed from a copolymer containing about 5 to about 35 percent, more preferably from about 9 to about 18, most preferably about 10 to about 13 percent, by weight of acrylic acid, wherein up to about 75 percent, most preferably about 60 percent, of the acid groups are neutralized with an organic fatty acid, salt thereof, or a metal ion, such as sodium, lithium, magnesium, or zinc ion.

Generally speaking, high crystalline acid copolymer and its ionomer derivatives are formed by polymerization of their base copolymers at lower temperatures, but at equivalent pressures to those used for forming a conventional acid copolymer and its ionomer derivatives. Conventional acid copolymers are typically polymerized at a polymerization temperature of from at least about 200° C. to about 270° C., preferably about 220° C., and at pressures of from about 23 to about 30 ksi. In comparison, the high crystalline acid copolymer and its ionomer derivatives employed in the present invention are produced from acid copolymers that are polymerized at a polymerization temperature of less than 200° C., and preferably from about 130° C. to about 200° C., and at pressures from about 20 to about 50 ksi.

The HNP's of the present invention may also be blended with cationic ionomers, such as those disclosed in U.S. Pat. No. 6,193,619 which is incorporated herein by reference. In particular, cationic ionomers have a structure according to the formula:

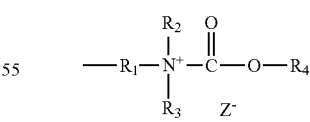

or the formula:

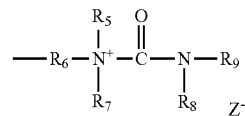

wherein $R_1$-$R_9$ are organic moieties of linear or branched chain alkyl, carbocyclic, or aryl; and Z is the negatively charged conjugate ion produced following alkylation and/or quaternization. The cationic polymers may also be quaternized up to 100% by the organic fatty acids described above.

In addition, such alkyl group may also contain various substituents in which one or more hydrogen atoms has been replaced by a functional group. Functional groups include but are not limited to hydroxyl, amino, carboxyl, amide, ester, ether, sulfonic, siloxane, siloxyl, silanes, sulfonyl, and halogen.

As used herein, substituted and unsubstituted carbocyclic groups of up to about 20 carbon atoms means cyclic carbon-containing compounds, including but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups as described above. The cyclic groups of the invention may further comprise a heteroatom.

The HNP's of the present invention may also be blended with polyurethane and polyurea ionomers which include anionic moieties or groups, such as those disclosed in U.S. Pat. No. 6,207,784 which is incorporated herein by reference. Typically, such groups are incorporated onto the diisocyanate or diisocyanate component of the polyurethane or polyurea ionomers. The anionic group can also be attached to the polyol or amine component of the polyurethane or polyurea, respectively. Preferably, the anionic group is based on a sulfonic, carboxylic or phosphoric acid group. Also, more than one type of anionic group can be incorporated into the polyurethane or polyurea. Examples of anionic polyurethane ionomers with anionic groups attached to the diisocyanate moiety can have a chemical structure according to the following formula:

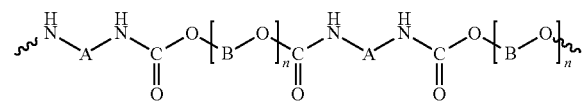

where $A=R-Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; B is a straight chain or branched aliphatic group, a substituted straight chain or branched aliphatic group, or an aromatic or substituted aromatic group; and n=1 to 100. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hr^{+x}$.

Exemplary anionic polyurethane ionomers with anionic groups attached to the polyol component of the polyurethane are characterized by the above chemical structure where A is a straight chain or branched aliphatic group, a substituted straight chain or branched aliphatic group, or an aromatic or substituted aromatic group; $B=R-Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; and n=1 to 100. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Examples of suitable anionic polyurea ionomers with anionic groups attached to the diisocyanate component have a chemical structure according to the following chemical structure:

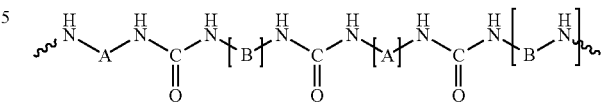

where $A=R-Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; and B is a straight chain or branched aliphatic group, a substituted straight chain or branched aliphatic group, or an aromatic or substituted aromatic group. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$, or Hr.

Suitable anionic polyurea ionomers with anionic groups attached to the amine component of the polyurea are characterized by the above chemical structure where A is a straight chain or branched aliphatic group, a substituted straight chain or branched aliphatic group, or an aromatic or substituted aromatic group; $B=R-Z-M^{+x}$; R is a straight chain or branched aliphatic group, a substituted straight chain or branched aliphatic group, or an aromatic or substituted aromatic group; $Z=SO_3^-$, $CO_2^-$, or $HPO_3^-$; M is a group IA, IB, IIA, IIB, IIIA, IIIB, IVA, IVB, VA, VB, VIA, VIB, VIIB or VIIIB metal; and x=1 to 5. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$, or $Hf^{+x}$. The anionic polyurethane and polyurea ionomers may also be neutralized up to 100% by the organic fatty acids described above.

The anionic polymers useful in the present invention, such as those disclosed in U.S. Pat. No. 6,221,960 which is incorporated herein by reference, include any homopolymer, copolymer or terpolymer having neutralizable hydroxyl and/or dealkylable ether groups, and in which at least a portion of the neutralizable or dealkylable groups are neutralized or dealkylated with a metal ion.

As used herein "neutralizable" or "dealkylable" groups refer to a hydroxyl or ether group pendent from the polymer chain and capable of being neutralized or dealkylated by a metal ion, preferably a metal ion base. These neutralized polymers have improved properties critical to golf ball performance, such as resiliency, impact strength and toughness and abrasion resistance. Suitable metal bases are ionic compounds comprising a metal cation and a basic anion. Examples of such bases include hydroxides, carbonates, acetates, oxides, sulfides, and the like.

The particular base to be used depends upon the nature of the hydroxyl or ether compound to be neutralized or dealkylated, and is readily determined by one skilled in the art. Preferred anionic bases include hydroxides, carbonates, oxides and acetates.

The metal ion can be any metal ion which forms an ionic compound with the anionic base. The metal is not particularly limited, and includes alkali metals, preferably lithium, sodium or potassium; alkaline earth metals, preferably magnesium or calcium; transition metals, preferably titanium, zirconium, or zinc; and Group III and IV metals. The metal ion can have a +1 to +5 charge. Most preferably, the metal is lithium, sodium, potassium, zinc, magnesium, titanium, tungsten, or calcium, and the base is hydroxide, carbonate or acetate.

The anionic polymers useful in the present invention include those which contain neutralizable hydroxyl and/or dealkylable ether groups. Exemplary polymers include ethylene vinyl alcohol copolymers, polyvinyl alcohol, polyvinyl acetate, polyp-hydroxymethylene styrene), and p-methoxy styrene, to name but a few. It will be apparent to one skilled in the art that many such polymers exist and thus can be used in the compositions of the invention. In general, the anionic polymer can be described by the chemical structure:

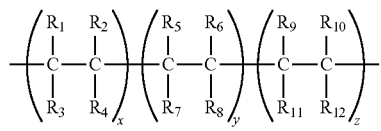

where $R_1$ is OH, $OC(O)R_a$, $O\text{-}M^{+V}$, $(CH_2)_nR_b$, $(CHR_z)_nR_b$, or aryl, wherein n is at least 1, $R_a$ is a lower alkyl, M is a metal ion, V is an integer from 1 to 5, $R_b$ is OH, $OC(O)R_a$, $O\text{-}M^{+V}$, and $R_z$ is a lower alkyl or aryl, and $R_2$, $R_3$ and $R_4$ are each independently hydrogen, straight-chain or branched-chain lower alkyl. $R_2$, $R_3$ and $R_4$ may also be similarly substituted. Preferably n is from 1 to 12, more preferably 1 to 4.

The term "substituted," as used herein, means one or more hydrogen atoms has been replaced by a functional group. Functional groups include, but are not limited to, hydroxyl, amino, carboxyl, sulfonic, amide, ether, ether, phosphates, thiol, nitro, silane, and halogen, as well as many others which are quite familiar to those of ordinary skill in this art.

The terms "alkyl" or "lower alkyl," as used herein, includes a group of from about 1 to 30 carbon atoms, preferably 1 to 10 carbon atoms.

In the anionic polymers useful in the present invention, at least a portion of the neutralizable or dealkylable groups of $R_1$ are neutralized or dealkylated by an organic fatty acid, a salt thereof, a metal base, or a mixture thereof to form the corresponding anionic moiety. The portion of the neutralizable or dealkylable groups which are neutralized or dealkylated can be between about 1 to about 100 weight percent, preferably between about 50 to about 100 weight percent, more preferably before about 90 to about 100.

Neutralization or dealkylation may be performed by melting the polymer first, then adding a metal ion in an extruder. The degree of neutralization or dealkylation is controlled by varying the amount of metal ion added. Any method of neutralization or dealkylation available to those of ordinary skill in the art may also be suitably employed.

In one embodiment, the anionic polymer is repeating units any one of the three homopolymer units in the chemical structure above. In a preferred embodiment, $R_2$, $R_3$, and $R_4$ are hydrogen, and $R_1$ is hydroxyl, i.e., the anionic polymer is a polyvinyl alcohol homopolymer in which a portion of the hydroxyl groups have been neutralized with a metal base. In another preferred embodiment, $R_2$, $R_3$ and $R_4$ are hydrogen, $R_1$ is $OC(O)R_a$, and $R_a$ is methyl, i.e., the anionic polymer is a polyvinyl acetate homopolymer in which a portion of the methyl ether groups have been dealkylated with a metal ion.

The anionic polymer can also be a copolymer of two different repeating units having different substituents, or a terpolymer of three different repeating units described in the above formula. In this embodiment, the polymer can be a random copolymer, an alternating copolymer, or a block copolymer, where the term "copolymer" includes terpolymers.

In another embodiment, the anionic polymer is a copolymer, wherein $R_5$, $R_6$, $R_7$, and $R_8$ are each independently selected from the group defined above for $R_2$. The first unit of the copolymer can comprise from about 1 to 99 percent weight percent of the polymer, preferably from about 5 to 50 weight percent, and the second unit of the copolymer can comprise from about 99 to 1 weight percent, preferably from about 95 to 50 weight percent. In one preferred embodiment, the anionic polymer is a random, alternating, or block copolymer of units (Ia) and (Ib) wherein $R_1$ is hydroxyl, and each of the remaining R groups is hydrogen, i.e., the polymer is a copolymer of ethylene and vinyl alcohol. In another preferred embodiment, the anionic polymer is a random, alternating or block copolymer of units (Ia) and (Ib) wherein $R_1$ is $OC(O)$ $R_5$, where $R_5$ is methyl, and each of the remaining R groups is hydrogen, i.e., the polymer is a copolymer of ethylene and vinyl acetate.

In another embodiment, the anionic polymer is an anionic polymer having neutralizable hydroxyl and/or dealkylable ether groups of as in the above chemical structure wherein $R_{1-9}$ and $R_b$ and $R_z$ are as defined above; $R_{10-11}$ are each independently selected from the group as defined above for $R_2$; and $R_{12}$ is OH or $OC(O)R_{13}$, where $R_{13}$ is a lower alkyl; wherein x, y and z indicate relative weight percent of the different units. X can be from about 99 to about 50 weight percent of the polymer, y can be from about 1 to about 50 weight percent of the polymer, and z ranges from about 0 to about 50 weight percent of the polymer. At least a portion of the neutralizable groups $R_1$ are neutralized. When the amount of z is greater than zero, a portion of the groups $R_{10}$ can also be fully or partially neutralized, as desired.

In particular, the anionic polymers and blends thereof can comprise compatible blends of anionic polymers and ionomers, such as the ionomers described above, and ethylene acrylic methacrylic acid ionomers, and their terpolymers, sold commercially under the trade names SURLYN® and IOTEK® by DuPont and Exxon, respectively. The anionic polymer blends useful in the golf balls of the invention can also include other polymers, such as polyvinylalcohol, copolymers of ethylene and vinyl alcohol, poly(ethylethylene), poly(heptylethylene), poly(hexyldecylethylene), poly (isopentylethylene), poly(butyl acrylate), acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly (butoxyethylene), poly(methoxyethylene), poly (pentyloxyethylene), poly(1,1-dichloroethylene), poly(4-[(2-butoxyethoxy)methyl]styrene), poly[oxy(ethoxymethyl) ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polyurethanes, main-chain heterocyclic polymers and poly(furan tetracarboxylic acid diimides), as well as the classes of polymers to which they belong.

The anionic polymer compositions of the present invention typically have a flexural modulus of from about 0.5 ksi to about 300 ksi, preferably from about 2 to about 200 ksi. The anionic polymer compositions typically have a material hardness of at least about 15 Shore A, preferably between about 30 Shore A and 80 Shore D, more preferably between about 50 Shore A and 60 Shore D. The loss tangent, or dissipation factor, is a ratio of the loss modulus over the dynamic shear storage modulus, and is typically less than about 1, preferably less than about 0.01, and more preferably less than about 0.001 for the anionic polymer compositions measured at about 23° C. The specific gravity is typically greater than about 0.7, preferably greater than about 1, for the anionic polymer compositions. The dynamic shear storage modulus, or storage modulus, of the anionic polymer compositions at about 23° C. is typically at least about 10,000 dyn/cm².

The base rubber typically includes natural or synthetic rubbers. A preferred base rubber is 1,4-polybutadiene having a cis-structure of at least 40%. More preferably, the base rubber comprises high-Mooney-viscosity rubber. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel. The crosslinking agent is present in an amount from about 15 to about 30 parts per hundred of the rubber, preferably in an amount from about 19 to about 25 parts per hundred of the rubber and most preferably having about 20 to 24 parts crosslinking agent per hundred of rubber. The core compositions of the present invention may also include at least one organic or inorganic cis-trans catalyst to convert a portion of the cis-isomer of polybutadiene to the trans-isomer, as desired.

The initiator agent can be any known polymerization initiator which decomposes during the cure cycle. Suitable initiators include peroxide compounds such as dicumyl peroxide, 1,1-di-(t-butylperoxy) 3,3,5-trimethyl cyclohexane, a-a bis-(t-butylperoxy)diisopropylbenzene, 2,5-dimethyl-2,5 di-(t-butylperoxy) hexane or di-t-butyl peroxide and mixtures thereof.

Fillers, which can be any compound or composition used to vary the density and other properties of the core, typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

The golf ball cores of the present invention may comprise a variety of constructions. Although as mentioned above, the materials used for each layer may be similar or nearly identical, the characteristics and properties of each layer may be modified as appropriate in accordance with the embodiments of the present invention.

The cover layer may include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates, in particular PPDI-based thermoplastic polyurethanes, and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethylene-propylene-non-conjugated diene terpolymer, and the like;

(6) Acrylic resins and blends of these resins with poly vinyl chloride, elastomers, and the like;

(7) Thermoplastics, such as urethane; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified, poly(trimethylene terepthalate), and elastomers sold under the trademarks HYTREL® by E.I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In one embodiment, the outer cover preferably includes a polyurethane composition comprising the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("H$_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol; polybutylene adipate glycol; polyethylene propylene adipate glycol; o-phthalate-1,6-hexanediol; poly(hexamethylene adipate)glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate and poly(hexamethylene carbonate)glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyl-diamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl) ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the present invention, saturated polyurethanes are used to form the outer cover layer, and may be selected from among both castable thermoset and thermoplastic polyurethanes.

In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, a catalyst may be employed to promote the reaction between the curing agent and the isocyanate and polyol.

Saturated diisocyanates which can be used include, without limitation, ethylene diisocyanate; propylene-1,2-diisocyanate; tetramethylene-1,4-diisocyanate; 1,6-hexamethylene-diisocyanate ("HDI"); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate ("HMDI") and isophorone diisocyanate ("IPDI").

Saturated polyols which are appropriate for use in this invention include without limitation polyether polyols such as polytetramethylene ether glycol and poly(oxypropylene)

glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

The compositions of the invention may also be polyurea-based, which are distinctly different from polyurethane compositions, but also result in desirable aerodynamic and aesthetic characteristics when used in golf ball components. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine, and at least one diol curing agent or at least one diamine curing agent.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® D2000 (manufactured by Huntsman Chemical Co. of Austin, Tex.).

The molecular weight of the polyether amine for use in the polyurea prepolymer may range from about 100 to about 5000. As used herein, the term "about" is used in connection with one or more numbers or numerical ranges, should be understood to refer to all such numbers, including all numbers in a range. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as Jeffamine D2000, is preferred.

In one embodiment, the polyether amine has the generic structure:

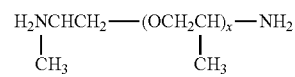

wherein the repeating unit x has a value ranging from about 1 to about 70. More preferably, the repeating unit may be from about 5 to about 50, and even more preferably is from about 12 to about 35.

In another embodiment, the polyether amine has the generic structure:

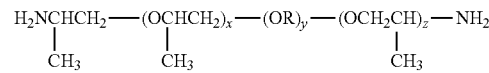

wherein the repeating units x and z have combined values from about 3.6 to about 8 and the repeating unit y has a value ranging from about 9 to about 50, and wherein R is —(CH$_2$)$_a$—, where "a" may be a repeating unit ranging from about 1 to about 10.

In yet another embodiment, the polyether amine has the generic structure:

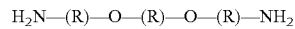

wherein R is —(CH$_2$)$_a$—, and "a" may be a repeating unit ranging from about 1 to about 10.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)- dicyclohexylmethane (CLEARLINK® 1000) may be suitable for use in combination with an isocyanate to form the polyurea prepolymer.

Any isocyanate available to one of ordinary skill in the art is suitable for use in the polyurea prepolymer. Isocyanates for use with the present invention include aliphatic, cycloaliphatic, araliphatic, aromatic, any derivatives thereof, and combinations of these compounds having two or more isocyanate (NCO) groups per molecule. The isocyanates may be organic polyisocyanate-terminated prepolymers. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The diisocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of diisocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4'-triisocyanate;

naphthylene-1,5-diisocyanate; 2,4'-, 4,4'-, and 2,2-biphenyl diisocyanate; polyphenyl polymethylene polyisocyanate (PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Examples of saturated diisocyanates that can be used with the present invention include, but are not limited to, ethylene diisocyanate; propylene-1,2-diisocyanate; tetramethylene diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate;

cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5; dimethylthio-2,4-toluenediamine; 3,5-dimethylthio-2,6-toluenediamine; 3,5-diethylthio-2,4-toluenediamine; 3,5; diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis(2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

Thermoplastic materials may be blended with other thermoplastic materials, but thermosetting materials are difficult if not impossible to blend homogeneously after the thermosetting materials are formed. Preferably, the saturated polyurethane comprises from about 1% to about 100%, more preferably from about 10% to about 75% of the cover composition and/or the intermediate layer composition. About 90% to about 10%, more preferably from about 90% to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate, or polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance.

Thermoplastic polyurethanes may be blended with suitable materials to produce a thermoplastic end product. Examples of such additional materials may include ionomers such as the SURLYN®, ESCOR® and IOTEK® copolymers described above.

Other suitable materials which may be combined with the saturated polyurethanes in forming the cover and/or intermediate layer(s) of the golf balls of the invention include ionic or non-ionic polyurethanes and polyureas, epoxy resins, polyethylenes, polyamides and polyesters. For example, the cover and/or intermediate layer may be formed from a blend of at least one saturated polyurethane and thermoplastic or thermoset ionic and non-ionic urethanes and polyurethanes, cationic urethane ionomers and urethane epoxies, ionic and non-ionic polyureas, and blends thereof. Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in U.S. Pat. No. 5,908,358, the disclosures of which are hereby incorporated herein by reference in their entirety.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers therefore helps to maintain the tensile strength and elongation of the saturated polyurethane elastomers. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogeneous (more random) and affords the manufacturer less control over the molecular structure of the resultant composition. A preferred method of mixing is known as a prepolymer method. In this method, the polyisocyanate and the polyol are mixed separately prior to addition of the curing agent. This method produces a more homogeneous mixture, resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

Additional components which can be added to the polyurethane composition include UV stabilizers and other dyes, as well as optical brighteners and fluorescent pigments and dyes. Such additional ingredients may be added in any amounts that will achieve their desired purpose.

The cover can also be made from ionomeric polymers or blends thereof, as described above.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety.

The cover is preferably formed around the core by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling. Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

Additionally, other suitable core and cover materials are disclosed in U.S. Pat. No. 5,919,100 and International Publication Nos. WO 00/23519 and WO 01/29129. These disclosures are incorporated by reference in their entireties. Preferably, inner core 12 is made from a polybutadiene rubber material, and cover layer 16 is made from a composition comprising a thermoset or thermoplastic urethane or a composition comprising an ionomer resin.

Referring back to FIG. 2, in one embodiment a multi-layer golf ball 20 comprises at least 3 pieces: an inner core 22, an outer core layer 24, and a cover 26 Inner core 22 has a diameter of about 1.40 inches, an Atti compression of less than 60, preferably less than 45, and most preferably less than 40. The compression preferably a number in the range from about 5 to about 60, more preferably from about 10 to about 50, and most preferably from about 15 to about 40. Inner core 22 also has a specific gravity of less than the outer core layer, preferably less than 1.15, and most preferably less than 1.10.

Accordingly, outer core layer 24 has a specific gravity greater than inner core 22, preferably greater than 1.15, more preferably greater than 1.20, and most preferably greater than 1.25. The Shore D hardness of outer core layer 24 is at least 55, with the flex modulus of outer core layer 24 preferably greater than the flex modulus of inner core 22. Outer core layer 24 also has a thickness of about 0.10 inches.

Cover layer 26 is at least about 0.04 inches thick and comprises a stiff ionomer blend, with a Shore D hardness of at least 60 and preferably at least 65. The flexural modulus of cover 26 is preferably at least 60 ksi. A preferred relationship between the Shore D hardness and the flexural modulus of cover layer 26, when the flexural modulus is measured in ksi and is at least 58 ksi, is as follows:

Preferably: $1.0 > $ (Flex Modulus$_{cover}$): (Shore D$_{cover}$)
More preferably: $0.9 > $ (Flex Modulus$_{cover}$): (Shore D$_{cover}$)
Most preferably: $0.8 > $ (Flex Modulus$_{cover}$): (Shore D$_{cover}$)

These relationships provide for a golf ball with lower spin off the tees, yet increased spin on approach shots to the green. Less advanced golfers benefit from added driving distances, while more skilled players receive more control of the ball around the greens.

In a preferred embodiment, cover layer 26 comprises an acrylic acid ionomer (Dow or Schulman type) having an acid content of between about 13% and 16%, although as will be recognized by those skilled in the art and discussed above, the type of ionomer and acid content range may vary. The ionomer is preferably neutralized with a cation of sodium (Na), lithium (Li), zinc (Zn), magnesium (Mg), or calcium (Ca), e.g., as discussed above, but again, as will be recognized by those skilled in the art, the cation used may vary.

In another embodiment, inner core 22, outer core layer 24, and cover 26 are all substantially similar to the preceding embodiments, but the materials, properties, and dimensions are selected as to result in a COR gradient of slow to fast. For example, inner core 22 has a lower COR than the subassembly comprising the inner core 22 and the outer core layer 24, which in turn has a lower COR than the entire golf ball 20 comprising the inner core 22, outer core 24, and cover 26. This slow to fast COR gradient provides for the ball to have a greater initial velocity and less spin when being hit off of the tees, yet still have higher spin rates when being hit on approach shots into the greens. This results in more forgiving drives that will travel longer distances for less skilled players with slower swing speeds, but more control and precision for advanced players with faster swing speeds.

Another embodiment of the inventive golf ball is substantially similar to the aforementioned embodiments, except that a core layer, either inner core 22 or outer core layer 24, comprises an HNP. In this embodiment, it is preferred that inner core 22 comprises an unfilled HNP wherein the specific gravity of the inner core is less than 1.0, most preferably about 0.95. This low specific gravity with an unfilled HNP at the center of the ball increases the moment of inertia of the ball, reducing its spin rate at the moment of striking and allowing it to travel longer distances off the tee.

Referring back to FIG. 1, in another embodiment the multi-layer golf ball 10 has at least 4 pieces, as it comprises an inner core 12, at least one intermediate core layer 14, an outer core layer 16, and a cover layer 18. In this embodiment the core subassembly includes 3 pieces that make up two separate subassemblies. One is an inner subassembly made up of inner core 12 plus at least one intermediate core layer 14, while the other comprises inner core 12 plus intermediate core layer 14 plus outer core layer 16. Additional embodiments may have multiple intermediate core layers 14 such that multiple subassemblies encompassing each successive intermediate core layer may be present. In the 3 piece core embodiment, the specific gravity of the inner core 12 is less than the specific gravity of the intermediate core layer 14, which in turn is less than the outer core layer 16. Cover layer 18 also has a specific gravity that is less than outer core layer 16. The volume of inner core 12 in the embodiment shown in FIG. 1 is larger than the volume of outer core layer 16, and both are larger than the volume of cover layer 18. The volume of the layers and the hardness of the layers have an inverse relationship, however. Cover layer 18 has a Shore D hardness larger than outer core layer 16, which in turn has a larger Shore D hardness than inner core 12. If multiple intermediate core layers are added, it is preferred that each successive intermediate core layer have a larger specific gravity, larger Shore D hardness, and smaller volume than the preceding intermediate core layer closer to inner core 12. The hardness of the outer portions of golf ball 10, such as outer core layer 16 and cover layer 18, is advantageous to lesser-skilled players due to its comforting sound and added distance that results when striking the ball, but the decreased hardness inside the ball is important to augment feel and control, similar to traditional wound balls, for advanced players.

Intermediate layer 14 may comprise materials such as thermosetting polybutadiene or other diene rubber based formulations, thermoplastic or thermosetting polyurethanes, polyureas, partially or fully neutralized HNP's, polyolefins including metallocene or other single site catalyzed polymers, polymers comprising silicone, polyamides, polyesters, polyether amides, polyester amides, and other materials known in the art. Intermediate layer 14 can be any layer between the innermost core and the outermost layer, and there can be a plurality of intermediate layers 14.

As used herein, the following terms are defined as:

Coefficient of Restitution (COR)—The ratio of the relative velocity between two objects after direct impact to the relative velocity before impact. As a result, the CoR can vary from 0 to 1, with 1 being equivalent to a perfectly or completely elastic collision and 0 being equivalent to a perfectly plastic or completely inelastic collision. Since a ball's CoR directly influences the ball's initial velocity after club collision and travel distance, golf ball manufacturers are interested in this characteristic for designing and testing golf balls.

One conventional technique for measuring COR uses a golf ball or golf ball subassembly, an air cannon, and a stationary vertical steel plate. The steel plate provides an impact surface weighing about 100 pounds or about 45 kilograms. A pair of ballistic light screens are spaced apart and located between the air cannon and the steel plate. The ball is fired from the air cannon toward the steel plate over a range of test velocities from 50 ft/sec to 180 ft/sec. All COR data presented in this application is measured using a speed of 125 ft/sec. As the ball travels toward the steel plate, it activates each light screen so that the time at each light screen is recorded. This provides an incoming time period proportional to the ball's incoming velocity. The ball impacts the steel plate and rebounds though the light screens, which again measures the time period required to transit between the light screens. This provides an outgoing transit time period proportional to the ball's outgoing velocity. The COR can be calculated by the ratio of the outgoing transit time period to the incoming transit time period.

Compression—At one time compression was used to describe the quality of a golf ball according to the tightness of the windings around a three piece ball core. In solid-core golf balls, compression now only indicates how much a ball will "deform" under a compressive force. It is measured by applying a spring-loaded force to the golf ball center, golf ball core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti compression values than harder, less compressible materials.

Flexural Modulus—The ratio of flexural stress to flexural strain within the elastic limit (when measured in the flexural mode) and is similar to the tensile modulus. This property is used to indicate the bending stiffness of a material and is measured according to ASTM Test Method D790.

Hardness—the characteristic of a solid material expressing its resistance to permanent deformation. It can be measured on numerous scales, but all hardness data in this application is measured using a Shore D Durometer. Testing is done according to ASTM Test Method D2240. The results obtained from this test are a useful measure of relative resistance to indentation of various grades of polymers.

Ionomer—a polymer, specifically a polyelectrolyte, that comprises copolymers containing both electrically neutral repeating units and a fraction of ionic units (usually no more than 15%). Due to ionic interactions in discrete regions of the material, ionomers typically have unique physical properties.

Specific Gravity—a ratio of the density of a substance relative to the density of another substance, most typically water. Because water has a density of 1 g/cc, the specific gravity of a material will usually be equal to the density, but dimensionless because the units cancel. Specific gravity is measured according to ASTM Test Method D792.

Unless otherwise expressly specified, all of the numerical ranges, amounts, values and percentages such as those for amounts of materials, and others in the specification may be read as if prefaced by the word "about" even though the term "about" may not expressly appear with the value, amount, or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements. Furthermore, when numerical ranges of varying scope are set forth herein, it is contemplated that any combination of these values inclusive of the recited values may be used. While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments which would come within the spirit and scope of the present invention.

We claim:

1. A golf ball comprising:
    an inner core having a compression of less than about 60, wherein the inner core comprises a highly neutralized thermoplastic ionomer;
    at least one intermediate layer surrounding the inner core, having a hardness of at least about 55 Shore D, a specific gravity and a flexural modulus such that each of the hardness, specific gravity and flexural modulus of the intermediate layer is greater than a hardness, a specific gravity, and a flexural modulus of the inner core; and
    a cover surrounding the at least one intermediate layer, having a flexural modulus and a Shore D hardness that are greater than a flexural modulus and a hardness of the inner core; and
    wherein the Shore D hardness of the cover is at least 60.

2. The golf ball of claim 1, wherein the intermediate layer comprises polybutadiene rubber.

3. The golf ball of claim 1, wherein the cover comprises a thermoplastic ionomer.

4. The golf ball of claim 1, wherein the cover comprises a polyurethane composition.

5. The golf ball of claim 1, wherein the compression of the inner core is less than about 40.

6. The golf ball of claim 1, wherein the cover has a thickness of 0.03 to 0.5 inches.

* * * * *